United States Patent [19]
Bell

[11] Patent Number: 6,148,173
[45] Date of Patent: Nov. 14, 2000

[54] SYSTEM FOR INITIALIZATION OF AN IMAGE HOLDER THAT STORES IMAGES WITH ASSOCIATED AUDIO SEGMENTS

[75] Inventor: Cynthia S. Bell, Webster, N.Y.

[73] Assignee: Eastman Kodak Company, Rochester, N.Y.

[21] Appl. No.: 09/031,246

[22] Filed: Feb. 26, 1998

[51] Int. Cl.[7] .................................................. G09B 5/00
[52] U.S. Cl. ........................ 434/309; 434/317; 40/455; 704/272; 704/201
[58] Field of Search .................................. 434/317, 309; 360/74.1; 40/455; 355/40; 704/272, 201

[56] References Cited

U.S. PATENT DOCUMENTS

| | | |
|---|---|---|
| 4,636,881 | 1/1987 | Brefka et al. . |
| 4,703,573 | 11/1987 | Montgomery et al. . |
| 4,809,246 | 2/1989 | Jeng . |
| 5,128,700 | 7/1992 | Inoue et al. . |
| 5,276,472 | 1/1994 | Bell et al. . |
| 5,359,374 | 10/1994 | Schwatz ................................ 40/455 X |
| 5,363,157 | 11/1994 | Cocca . |
| 5,387,955 | 2/1995 | Cocca . |
| 5,437,552 | 8/1995 | Baer et al. . |
| 5,451,178 | 9/1995 | Yoruzo et al. ....................... 446/175 X |
| 5,504,836 | 4/1996 | Loudermilk .......................... 395/2.81 X |
| 5,520,544 | 5/1996 | Manico et al. ....................... 434/317 X |
| 5,577,918 | 11/1996 | Crowell ................................ 434/319 X |
| 5,645,432 | 7/1997 | Jessop .................................. 434/317 X |

*Primary Examiner*—Jessica J. Harrison
*Assistant Examiner*—Chanda Harris
*Attorney, Agent, or Firm*—Francis H. Boos, Jr.; Roland R. Schindler, II

[57] ABSTRACT

An image holder such as a picture album (10) includes a plurality of pages (14) that receive printed images (18). The pages (14) also have markers (20) placed thereon, with each marker corresponding to one of the images. A memory (25) stores audio segments associated with the respective images. A user may place the printed images in any order in the image holder. A controller (22) performs an initialization routine to match the image locations with corresponding audio segments for future playback. Once the initialization is complete, whenever a user selects a marker associated with an image, the audio segment associated with that image is played back.

15 Claims, 3 Drawing Sheets

SYSTEM FOR INITIALIZATION OF AN IMAGE HOLDER THAT STORES IMAGES WITH ASSOCIATED AUDIO SEGMENTS

FIELD OF THE INVENTION

The present invention relates to visual images that have audio segments associated with them and, more particularly, to a method and apparatus for maintaining the correspondence between the images and the associated audio segments when the images are placed in an image holder in a random order.

BACKGROUND OF THE INVENTION

Cameras which capture sound as well as visual images are well known in the art. However, the biggest challenge presented by images with associated audio segments is maintaining the correct sound-to-picture correspondence from the time the images and audio segments are captured until the image is viewed and the corresponding audio segment is played. This is particularly problematic when the printed images are placed in an album. People typically discard some printed images that are unappealing or blurry, and group other pictures in an album in a non-sequential order for effect or because of the restrictions associated with fitting multiple format pictures, including vertical and horizontal shots, as well as panoramic shots onto album pages. Thus, the first image from a roll of film may be placed at the back of an album or in any other position in the album, such that the first image in the album will not correspond with the first audio segment stored in memory. Therefore, while the audio segments are maintained in a chronological order according to when they were recorded, the printed images may be arranged in any order, which makes associating the images with the corresponding audio segments difficult.

Others have proposed affixing magnetic tapes directly to the printed images in order to associate the image with the corresponding audio segment. Thus, in those devices there is no concern with regard to maintaining the proper correspondence between the images and audio segments. However, these image/audio segment combinations require a specially designed playback unit in order to reproduce the audio segment. Furthermore, such a construction prevents the printed images from being permanently placed in a photograph album, as the printed images must be physically placed in the playback unit each time the viewer wants to hear the audio segment. Thus, it will be apparent to those of ordinary skill in the art that this method is inefficient and relatively expensive by requiring a special playback unit.

In addition, others have proposed books including printed pages and stored audio segments corresponding with the respective printed pages. For example, U.S. Pat. No. 4,703,573 discloses a book having printed pages, with each bearing multiple printed graphic designs. The book is sensitive to the pages being turned to retrieve and play a corresponding audio segment, based upon the page to which the book is turned. However, such a construction fails to disclose any means for maintaining the correspondence between images and audio segments in the event the image locations are changed. Thus, the issue of correlating a user-positioned image with a corresponding audio segment is in no way dealt with by this reference.

Similarly, U.S. Pat. No. 5,437,552 discloses an audio-visual book that includes multiple printed pages bearing graphics and text, and including a plurality of push buttons that correspond with respective audio segments. The device provides a recording mode of operation for recording over the original factory recordings. However, there is a predetermined correspondence between the graphics and the audio segments, and therefore the issue of correlating a user-positioned image with a corresponding audio segment is not addressed or resolved by this reference either.

Other prior art devices have addressed the need to determine the page to which a book is opened. For example, U.S. Pat. Nos. 4,809,246 and 4,636,881 describe different approaches for determining the current page being viewed. In U.S. Pat. No. 4,636,881, an infrared detector is used to detect the turning of pages. In U.S. Pat. No. 4,809,246, cutouts formed on each page give a unique pattern to an array of light detectors, and that pattern can be decoded to determine the current page. As with the other prior art devices mentioned above, neither of these devices addresses the problem of correlating a user-positioned image with a corresponding audio segment.

Finally, U.S. Pat. No. 5,520,544 describes the use of optical devices integrated into the pages of a photo album to determine which page and which image are of interest to the viewer, for the purpose of playback of a corresponding audio segment. Such a system calls for the playback of an audio segment based upon the page to which the album is opened, and discloses a means that allows a user to place images in the album on particular pages and in particular locations on those pages. However, the device does not address the problem of establishing links between the corresponding audio segments with the user-selected positions. Thus, it will be apparent that none of the prior art described herein has resolved or even addressed the problem of linking audio segments with the corresponding printed images that have been randomly placed in an image holder by a user.

Accordingly, it will be apparent that there continues to be a need for an image holder that may "learn" where particular printed images have been placed in an image holder for associating that location in the image holder with the corresponding audio segment. In addition, there is a need for such an image holder that can re-learn the printed image locations each time a viewer adds new images to the image holder or changes image locations within the image holder so that the locations can be linked with the appropriate audio segments. The present invention addresses these needs and others.

SUMMARY OF THE INVENTION

It is one object of the present invention to provide an image holder containing printed images and audio segments, and that plays the corresponding audio segment with the selection of a particular image by a viewer.

It is another object of the present invention to provide an initialization scheme that allows a user to freely organize printed images in an image holder and that links the corresponding sound segments with the locations of the printed image.

In accordance with the above objects, the present invention in one preferred embodiment is a system that comprises an image holder including a plurality of markers, and a plurality of image receptacles for mounting a plurality of images. Each of the receptacles is associated with a corresponding one of the markers. The system further includes a memory mounted in the image holder for storing audio segments corresponding with the respective image prints, and a controller mounted in the image holder and electrically connected to the respective markers. The controller is programmable to associate each of the markers with a corresponding audio segment in the memory and is responsive to selection of one of the markers to retrieve the corresponding audio segment from memory. Finally, the system has a sound playback system housed in the image holder and electrically connected to the controller, for receiving audio segments from the controller and for playing the audio segments.

In yet another embodiment, the present invention comprises a method of associating plural images with plural audio segments in an image holder including plural image receptacles, plural markers corresponding with the respective receptacles, and a memory for storing audio segments. The method comprises the steps of: after a user has mounted a plurality of images in the respective image receptacles and added a plurality of audio segments to the memory, (I) audibly playing one of the audio segments; (II) querying a viewer to select a corresponding one of the markers associated with the respective image receptacles; (III) sensing the selection of one of the markers to create a link between the selected marker and the audio segment played; (IV) storing the link for future reference when the marker is selected again; and (V) repeating steps I–IV one or more times for each audio segment stored in memory.

BRIEF DESCRIPTION OF THE DRAWINGS

The foregoing as well as other features and objects of the present invention can be better understood from the following detailed description of preferred embodiments taken in conjunction with the appended drawings wherein.

DETAILED DESCRIPTION OF THE PREFERRED EMBODIMENT

Figure 1:
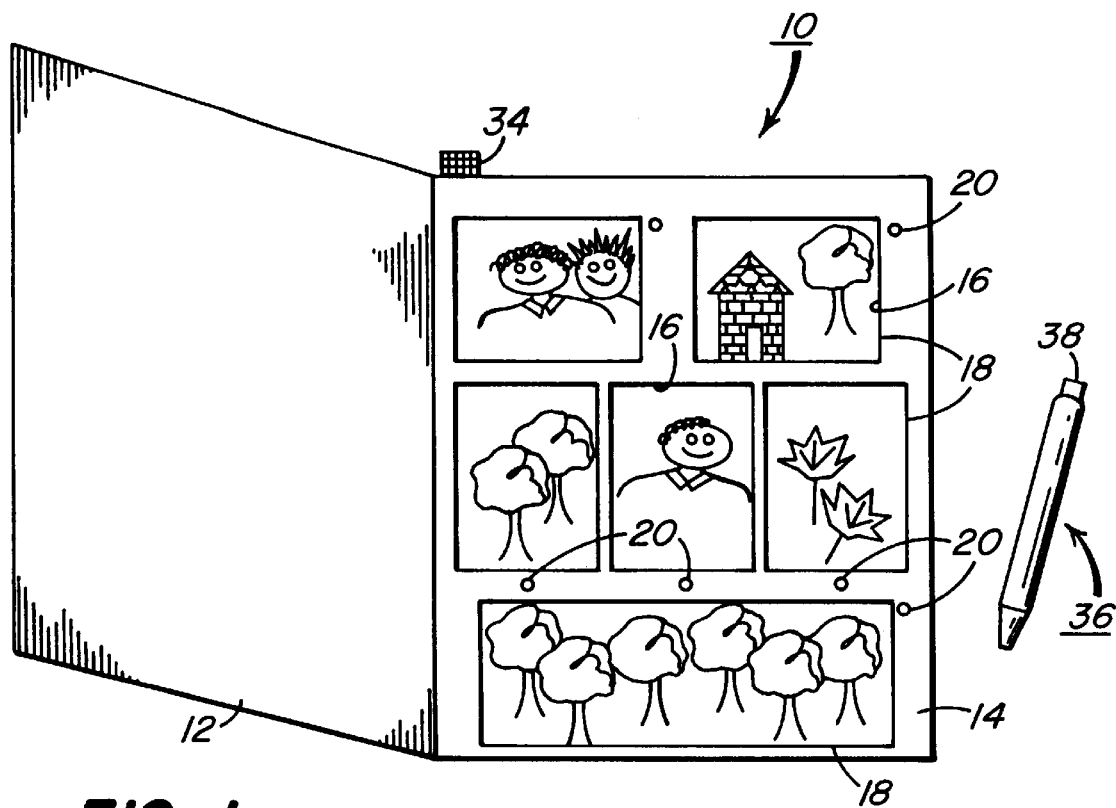
FIG. 1 is a view of an image holder or picture album embodying the present invention.

In the following detailed description, like reference numerals will be used to refer to like or corresponding elements in the various figures. Referring now to FIG. 1, there is shown an image holder 10 embodying the present invention. The image holder is preferably in the form of a conventional photograph holder or album that is modified to incorporate electronics for associating the printed images mounted in the image holder with corresponding audio segments and for playing those audio segments based upon selections made by a viewer. The image holder 10 includes a binder 12 and one or more pages 14 mounted in the binder, with each page including one or more image receptacles 16 for releasably holding printed images 18. Each image receptacle has a corresponding marker or selector 20 attached to the page as described in greater detail below.

Figure 2:
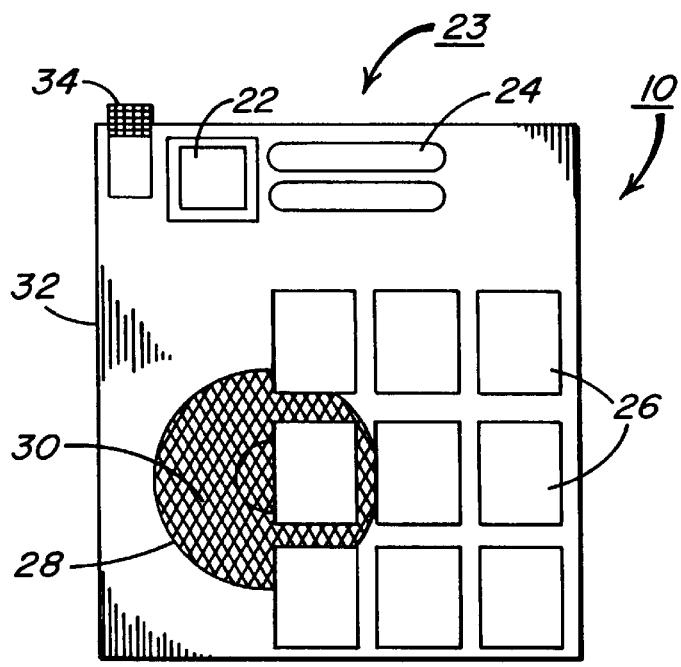
FIG. 2 is a schematic of the electronic components of the image holder of FIG. 1.
Figure 3:
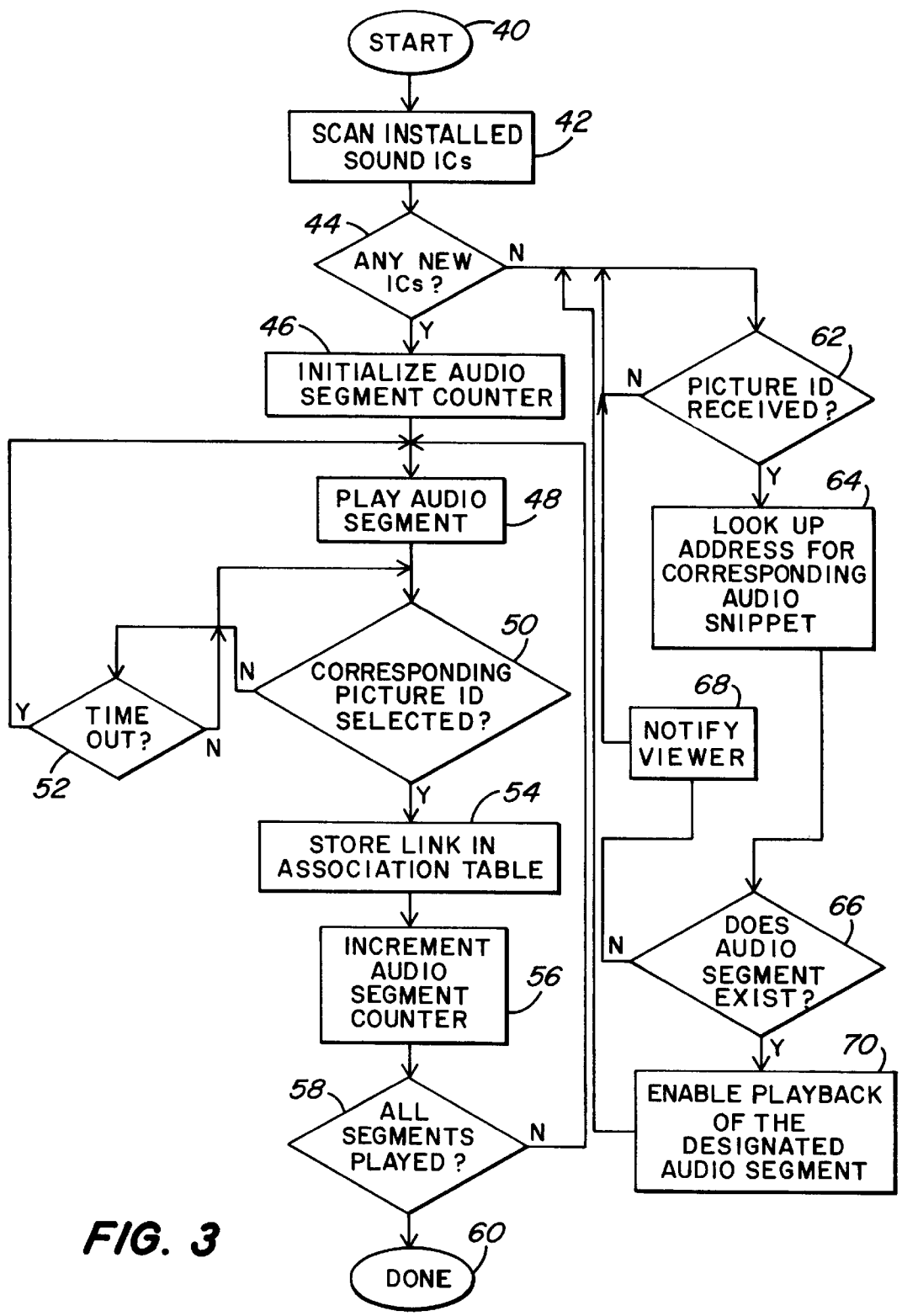
FIG. 3 is a flowchart depicting the operational flow of an initialization scheme for linking audio segments with printed image locations in the image holder.
Figure 4:
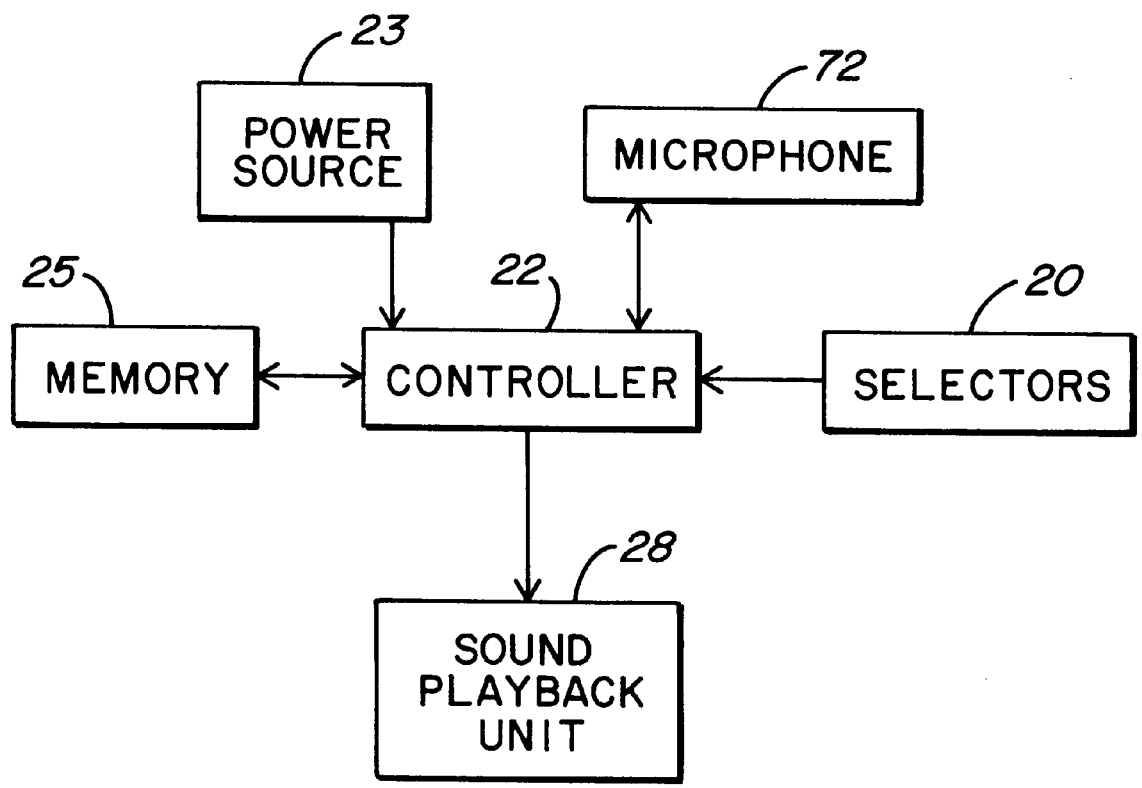
FIG. 4 is a block diagram of the electronic components included in the image holder of FIG. 1.

Referring now to FIGS. 2 and 4, there is shown schematically the electronic components of the image holder 10. The image holder preferably includes a controller 22, a power source 23 that is preferably in the form of one or more batteries 24, a memory 25 that in one preferred embodiment comprises a plurality of sound IC chips 26 storing audio segments at known memory addresses, and a sound playback unit 28 including a speaker 30. A switch (not shown) may be provided on the image holder to selectively activate the electronic components of the image holder. The controller 22, the operation of which is described in greater detail below in connection with FIG. 3, is responsive to receipt of receptacle identification data (receptacle ID data) to retrieve the corresponding digital audio segment data from one of the sound IC's and to communicate the digital data to the sound playback unit for playing the audio segment. The sound IC's, controller, and sound playback unit are all preferably mounted on a printed circuit board 32 to establish electrical communication between the various electronic components of the system. The circuit board and electronic components mounted thereon are preferably housed inside either the front or back cover of the image holder 10.

Referring now to FIG. 1, it will be apparent to those of ordinary skill in the art that the markers or selectors 20 may take several different forms. In one preferred embodiment, the markers are in the form of tactile sensors operative to sense contact with a viewer's finger or other object, and are responsive to sensing such contact to generate a corresponding activation signal. In this preferred embodiment, the respective markers are electrically connected to the controller 22 for transmitting the activation signals directly to the controller (FIG. 4). The markers preferably transmit unique receptacle identifiers in the form of distinguishable signals, such as frequency modulated signals, pulses of varying duration, or other well known signal differentiating methods to enable the controller to distinguish between the respective markers and to retrieve the appropriate audio segment from the sound IC's as described in greater detail below.

In another embodiment, the markers 20 comprise encoded icons, such as those described in pending U.S. patent application Ser. No. 08/705,350 to Patton et al., filed Aug. 29, 1996, the disclosure of which is incorporated herein by reference. In this embodiment, the icons preferably comprise a plurality of data portions that bear encoded receptacle ID data which can be used to uniquely identify the address of an audio segment file stored in one of the sound IC's 26. The data portions preferably comprise a series of binary encoded segments that can be decoded to represent a particular receptacle in the image holder. The controller 22 uses the decoded data to determine, through the use of an association table, the corresponding sound IC and address within that sound IC to access the corresponding sound data file.

In this alternative embodiment, the image holder 10 includes an optional receiver 34 mounted on the image holder and electrically connected to the controller 22. An icon reader 36 is also provided that includes an optical data reader module for reading the encoded receptacle ID data contained in the icons 20. The icon reader further includes a transmitter 38 for transmitting the encoded ID data to the receiver. The transmitter and receiver may utilize IrDA (infrared data association) serial protocol technology, or may comprise an RF transmitter and receiver pair, or other well known wireless communication devices. Alternatively, the icon reader could be coupled to the controller through a cable (not shown) for communicating the receptacle ID data directly to the controller. A suitable form of icon reader is disclosed in U.S. patent application Ser. No. 09/031,244, Docket Number 1699/0D788, filed concurrently herewith, the rights to which have been assigned to the assignee of the rights to the present invention. Briefly, the data reader module is controlled to sequentially sample the data segments of the icon in order to read the encoded receptacle ID data therefrom. The encoded data is then transmitted to the controller 22 where it is decoded and used as input into the stored association table to determine the location of the corresponding audio segment.

Alternatively, the icon reader 36 may be formed with a picture ID code reader similar to that currently being used to read compact two dimensional bar codes. A suitable form of such a device is the Mini-Code, available from Princeton, or other similar devices.

Referring to FIG. 3, the operational flow of the controller 22 in performing the initialization routine will now be described in detail. When the user installs a new sound IC into the circuit board 32 and actuates the album via an on-off switch (not shown), the initialization routine is commenced. The purpose of the initialization routine is to create an image/audio segment association table that is stored in the EPROM of the controller for subsequent referral. Once the initialization routine has been performed, the viewer need only cause the encoded receptacle identification data to be transmitted to the controller in order for the corresponding audio segment to be audibly reproduced.

As is shown in FIG. 3, the controller is initially actuated when a viewer flips an on-off switch on the image holder, at step 40. The controller then determines whether the initialization routine is necessary by scanning the sound IC chip sockets of the circuit board 32 for any newly installed chips 26, at function block 42. If a new sound IC chip is discovered at query block 44, operation then proceeds through the initialization routine. The first step in the initialization routine, at block 46, is to initialize an audio segment counter or some other number generator, which is used to establish unique identifiers for each audio segment contained in the sound IC. This is appropriate for sound IC's such as those manufactured by Information Storage Devices, that store audio segments as counted records offset from the top of the internal memory. Alternatively, if the sound IC is a device that is based on conventional memory structures, then the counter step need not be performed, and the actual memory addresses for the audio segments as read from the sound IC itself are used as the identification addresses for the audio segments.

Next, at step 48, the first audio segment is audibly reproduced, hereafter called playback. During playback and for a selected amount of time after playback, the controller 22 waits for the user to identify the location of the corresponding printed image to be linked with the reproduced audio segment. If the selected amount of time elapses without any identification being received by the processor, at query block 52, operation then flows back to block 48 and the audio segment is preferably played one additional time. Alternatively, the controller could bypass that audio segment, retrieve the next audio segment, and play that segment. The identification of the corresponding image is performed by means of the user selecting the marker or selector 20 beside that corresponding image, either by contacting a tactile sensor, by placing the code reader 36 over the encoded icon beside the corresponding image, or by some other appropriate means.

When a receptacle ID number is received corresponding with selection of one of the markers 20, at query block 50, the controller 22 creates a new entry in its association table and stores the receptacle ID number, a number designating the sound IC containing the audio segment, and the address or offset in the sound IC represented by the audio segment counter, all of which defines a link between the location of the image in the image holder 10 and the corresponding audio segment location in one of the sound IC's. Preferably, the controller acknowledges the completion of the task by audibly playing a designated sound, such as a series of tones. The audio segment counter is then incremented at function block 56 in order to correspond to the sound IC offset for the next audio segment, if needed. The controller next determines whether all audio segments have been linked with a corresponding printed image, at query block 58, by checking if each audio segment has been audibly reproduced at least once. If so, the initialization routine is complete, as indicated by step 60. It will be apparent that not every audio segment will necessarily have a corresponding printed image in the image holder. For example, certain printed images will be disposed of or will not be mounted in the image holder, and therefore require no link to any printed image. It will also be apparent to those of ordinary skill in the art that the system of the present invention offers viewers flexibility in linking audio segments from discarded images to any other image as desired by the viewer.

Once the initialization routine is complete, a suitable audio message is preferably played to inform the user of this. If there are unlinked audio segments remaining that have yet to be audibly reproduced, operation instead flows back to step 48, and the next audio segment in the sound IC that has yet to be linked to an image is audibly played back.

The printed images may include a code formed on the front or back side, such as a printed number, to assist a viewer in determining which audio segment corresponds with a particular image. Thus, in the event the viewer forgets which audio segment applies to a particular image, the viewer may simply read the code on the image to determine, for example, which image is being viewed. The controller 22 could play a message before the audio segment, such as "This is the audio segment associated with the [Nth] captured image." In this manner, the viewer would know which images and audio segments correspond.

If the controller determines at query block 44 that no new sound IC's are present, then operation flows to the normal playback mode. In the normal playback mode, operation initially flows to query block 62, and the controller remains idle and waits for a picture receptacle ID to be received. This, again, is accomplished by actuating a tactile sensor 20 next to the image of interest, by using the icon reader 36 to communicate the picture ID number contained in one of the markers, or by other suitable means. Upon receiving a receptacle ID number, the controller searches the association table for the entry that contains that receptacle ID number, at function block 64. Once located, the controller determines if there is in fact a corresponding audio segment for that image, at query block 66. If not, operation flows to block 68, and the viewer is notified that no audio segment has been received for that image. Operation then flows back to step 62, and the controller waits to receive another receptacle ID number. It will be apparent that some printed images will have no associated audio segment. For example, the person capturing the image may have decided not to record any audio in connection with that image. Alternatively, one or more of the printed images in the image holder may have been captured with a conventional camera that does not provide audio recording capabilities.

If a corresponding audio segment does in fact exist for the selected image, the controller 22 next determines from the association table the memory location of the corresponding audio segment and retrieves that audio segment from the appropriate sound IC. The controller then transmits the audio segment to the sound playback unit 28, at block 70. Either during or immediately after playback, operation flows back to step 62 and the controller returns to the wait state for additional playback requests.

It will be apparent that the initialization routine may also be performed at times other than those when a new sound IC is sensed by the controller. For example, a viewer may become tired of one or more of the images 18 in the image holder 10 and replace those images with new images. The new images may have their audio segments stored in one of the sound IC's already installed in the image holder. Thus, the next time the controller 22 scans the sound IC's for any newly installed sound IC's, it would find none. Thus, the image holder is preferably provided with a reset or re-initialization button (not shown) to allow a user to cause the controller to perform the initialization routine. This routine would reset the controller, so that each sound IC would be considered a newly installed sound IC. Thus, the controller would play each audio segment and record the links in the association table. Alternatively, the re-initialization routine could be set up to allow a user to activate markers corresponding with selected receptacles in which the images are to be changed out. This would alert the controller that only selected receptacles would need to be associated with audio segments, rather than requiring that the procedure be performed for all of the receptacles.

Alternatively, the image holder 10 may include a mass memory storage unit (not shown) such as a magnetic hard disk or an optical WORM drive. In this embodiment, a data input device is provided, which may comprise a card reader or a data port, which is used for transferring data from one or more sound IC chips or sound IC cards to the mass memory storage unit.

The image holder 10, in one preferred embodiment, also includes a microphone 72 (FIG. 4). In this embodiment, when the controller determines that there is no audio segment corresponding with a particular printed image, the controller preferably queries the viewer whether he or she desires to record an audio segment for the selected image. If so, the controller would receive the audio segment as sensed by the microphone, convert the audio segment to a suitable format such as a digital stream, and store the audio segment stream in an available portion of memory of one of the sound IC's.

From the foregoing, it will be apparent to those of ordinary skill in the art that the image holder 10 of the present invention provides an initialization routine to reliably and accurately associate printed images with their corresponding audio segments. The image holder does not require that the user mount the printed images in any particular order, and therefore provides a degree of flexibility to the user in determining the order in which the images are mounted in the image holder.

While several forms of the invention have been illustrated and described, it will be apparent to those of ordinary skill in the art that various modifications and improvements may be made without departing from the scope and spirit of the present invention. Accordingly, it is not intended that the present invention be limited, except as by the appended claims.

Parts List 10 image holder
12 binder
14 image holder pages
16 image receptacles
18 printed images
20 marker or selector
22 controller
23 power source
24 batteries
25 memory
26 sound IC chips
28 sound playback unit
30 speaker
32 printed circuit board
34 receiver
36 icon reader
38 transmitter
72 microphone 72

What is claimed is:

1. A system for associating a plurality of image prints with corresponding audio segments, the system comprising:
   an image holder including a plurality of markers and a plurality of image receptacles, each said image receptacle mounting one of the printed images, each of the receptacles being associated with a corresponding one of the markers;
   a memory mounted in the image holder and in which there is stored one or more audio segments corresponding with the respective image prints;
   a controller mounted in the image holder and electrically connected to the respective markers, the controller being programmable in response to receipt of user-supplied association data to associate each of the markers with any of the audio segments in the memory, the controller being responsive to selection of one of the markers to retrieve the audio segment associated by the user with the marker; and
   a sound playback system housed in the image holder and electrically connected to the controller to receive audio segments from the controller and play the audio segments.

2. The system of claim 1 wherein the memory comprises one or more sound IC chips, each of which is electrically connected to the controller.

3. The system of claim 1 wherein the memory comprises one or more sound IC cards, each of which is electrically connected to the controller.

4. The system of claim 1 wherein the markers comprise tactile sensors responsive to touching by a viewer to generate a selection signal; and
   the controller is responsive to receipt of the selection signal to retrieve the corresponding audio segment from the memory.

5. The system of claim 1 wherein the markers comprise icons containing encoded receptacle ID data and further including:
   an icon reader including a data reader module, the icon reader being operative to read the encoded receptacle ID data from the icon, said icon reader further including a transmitter that is operative to transmit the encoded receptacle ID data; and
   a receiver mounted on the image holder and electrically connected to the controller, said receiver being operative to receive the encoded receptacle ID data from the icon reader and to communicate the receptacle ID data to the controller.

6. A system for associating a plurality of image prints with corresponding audio segments, the system comprising:
   an image holder including a plurality of icons containing identification data, the image holder comprising a plurality of image receptacles that mount the respective image prints, each of the receptacles being associated with a corresponding one of the icons;
   a memory mounted in the image holder, said memory storing audio segments corresponding with the respective image prints;
   a controller mounted in the image holder, the controller being programmable to associate the identification data from an icon with any of the audio segments in the memory, the controller being responsive to selection of one of the icons to retrieve the audio segment associated by the user with the icon;

an icon reader including a data reader module that reads the icons, the icon reader being in communication with the controller to transmit the identification data to the controller; and a sound playback system housed in the image holder and electrically connected to the controller, said sound playback system receiving audio segments from the controller and playing the audio segments.

7. The system of claim 6 wherein the icon reader includes a transmitter for transmitting the identification data and further including:

a receiver mounted on the image holder and electrically connected to the controller, the receiver receiving the identification data from the transmitter and communicating the identification data to the controller.

8. The system of claim 7 wherein the transmitter and receiver communicate via infrared data association.

9. The system of claim 7 wherein the transmitter and receiver communicate via RF signals.

10. The system of claim 6 wherein the memory comprises one or more sound IC chips, each of which is electrically connected to the controller.

11. The system of claim 6 wherein the memory comprises one or more sound IC cards, each of which is electrically connected to the controller.

12. A method of associating plural images with plural audio segments in an image holder including plural image receptacles, plural markers and a memory for storing audio segments, each marker corresponding with one of the receptacles, the method comprising the steps of:

after a user has mounted a plurality of images in the respective image receptacles and added a plurality of audio segments to the memory, (I) audibly playing one of the audio segments;

(II) querying a viewer to select one from any of the markers associated with the respective image receptacles;

(III) sensing the selection of one of the markers to create a link between the selected marker and the audio segment played;

(IV) storing the link for future reference when the marker is selected again; and (V) repeating steps I–IV one or more times for each audio segment stored in memory.

13. The method of claim 12 wherein the memory comprises sound IC cards, and the audio segments are added by means of installing a sound IC card and connecting it to the controller.

14. The method of claim 12 and further including the step of:

if no selection is made by the viewer, replaying the audio segment at least one additional time.

15. The method of claim 12 wherein the step of storing the link comprises creating a new entry in an association table and storing receptacle ID information and audio segment location information.

* * * * *